Patented May 6, 1947

2,420,264

UNITED STATES PATENT OFFICE 2,420,264

STABILIZING MEANS FOR THE CONTROL OF A FREQUENCY MODULATED ULTRA-SHORT WAVE TRANSMITTER

Helge Fabian Rost, Djursholm, Karl Harry Thunell, Nockeby, Sten Daniel Vigren, Stockholm, and Per Harry Elias Claesson, Jakobsberg, Sweden Application June 30, 1942, Serial No. 449,100
In Sweden May 26, 1941

14 Claims. (Cl. 250—36)

The present invention refers to means in ultra-short wave transmission and/or reception, preferably below a wave length of one meter, in a number of applications, among which may be mentioned, by way of example, the measuring of distances to objects in space.

The invention also comprises a number of important details of said means, among which may be mentioned:

A single ultra-short wave receiver for localizing and for following a movable target in the space; improved measuring of distances with comparative control of the distance to a target by means of known fixed control distances; controlling means to keep the basic frequency of ultra-short wave transmitters constant by the use of closed metal cavity resonators; frequency modulating means for velocity modulated electron tubes directed ultra-short wave transmission for communication purposes with superheterodyne reception and frequency stabilization with the aid of closed metal cavity resonators ultra-short wave receivers with velocity modulated electron tubes, and so forth.

The invention is also particularly suited for directed secret ultra-short wave communication, for instance between islands and mainland, or generally between places where the erection of line systems is expensive or difficult to execute.

The invention will be explained more fully hereinafter with reference to the accompanying drawings, wherein.

When distances to a flying machine are measured the following desirable features should be taken into consideration:

(1) The distance measuring device should be able to operate with the least possible amplitudes of wave energy reflected against a flying machine and received by said measuring device.

(2) The distance measuring device should operate rapidly and exactly.

The requirements of feature (1) mean that the smallest possible frequency band should be amplified. The noise level originating from electronic bombardment in electronic tubes and the like, as is well known, is approximately proportional to the width of the amplified frequency band. If the flying machine is at great distance, the incoming reflected wave energy would be so weak as to be ruled out by the noise level distributed over a broad frequency band, if such a band were used.

If, however, according to feature (2) exact measurement of distance is desired, frequency modulation must be resorted to, which means that a relatively broad frequency band must be amplified.

Accordingly, features (1) and (2) appear to be contrary to each other.

The present invention, however, solves the problem in such a way, that features (1) and (2) are simultaneously satisfied.

The conditions according to the invention are that only a narrow frequency band will have to be taken care of preliminarily in the registering apparatus, which shows the distance, and that subsequently a comparatively wide frequency band obtained through frequency modulation is received in the apparatus and amplified, to a certain extent at least.

In order accurately to determine the magnitude of the beat frequency received, preferably a frequency meter of wave analyzer type of known construction is made use of, by means of which frequencies may be measured with an exactness involving deviations of 0.1 per cent at the most. By reason of overtones in the transmitted wave, the beat tone received will seldom become purely sinuous, and consequently, according to one form of embodiment of the present invention, the distance is preliminarily determined in a special manner, which will be described hereinafter, whereupon it will be determined accurately by means of a wave analyzer.

The wave analyzer only receives a very narrow frequency band, so that disturbances are avoided.

Figure 1:
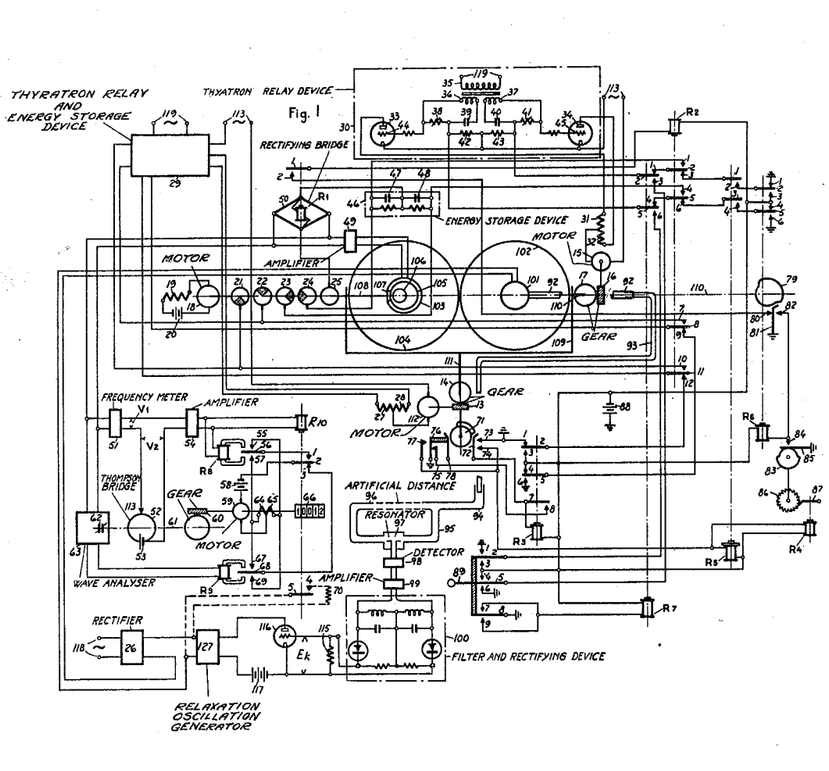
Fig. 1 shows an automatic device for measuring the distance to an object in space by means of a transmitter and a single receiver with comparative control of the measured distance with the aid of known fixed control distances.

The preliminary determination of the distance may, for instance, take place in any one of the following ways:

(a) By means of an arrangement as shown in Fig. 1 a frequency modulation of average strength will be obtained, so that a distance of 10,000 meters, for example, corresponds to a frequency of, for example, 6000 cycles.

(b) By means of a slight frequency modulation, for instance, by preliminarily connecting a resistance 70 (Fig. 1) in parallel to the modulating device of the transmitter, and receiving the beat frequency on a frequency meter connected to the receiver. Here, only a narrow frequency band will be amplified, so that a preliminary adjustment of the wave analyzer 62—63 may take place. Connection may be established, for instance, according to Fig. 1, whereupon the resistance 70 is disconnected by means of a relay R10, so that the adjusting means of the wave analyzer may effect the fine adjustment.

(c) By means of preliminary impulse modulation on the transmitter (echo sounding) for an approximate measurement of distances in known manner, whereupon reswitching is effected by means of a relay to frequency modulation for an exact determination of the distance. The switching from impulse modulation to frequency modulation may instead be effected with the aid of a Thompson-bridge in place of a relay. In the time between a transmitted and a reflected wave, a condenser may be charged over an electron tube, the grid of which at the transmission of an impulse gives a positive tension, so that current is allowed to pass through the tube to the condenser, but which at the reception of a reflected impulse prevents the passage of said current. The charge of the condenser constitutes a measure of the time interval between the transmitted wave and the received reflected wave. When the condenser is then discharged through a relay, reswitching may then be automatically effected to frequency modulation.

(d) By means of a wave analyzer provided with so-called automatic blocking in the same way as in radio apparatus, that is to say, it does not react before the received signal has a certain strength. Hereby it will be attained that the wave analyzer may be arranged to search for different beat frequencies. Those of the beat frequencies which have a small amplitude originating in disturbances and the like are then too weak to actuate the wave analyzer. On the other hand, when the basic tone of a beat frequency, the amplitude of which is comparatively great, is obtained from the object in question, the wave analyzer will be actuated so as to react and can be made to follow and accurately to show the frequency and thus the distance. The wave analyzer must then be preceded by an amplifier with proper automatic volume control, so that disturbing tones are prevented to reach such a strength as to actuate the wave analyzer.

A wave analyzer according to the superheterodyne principle consists of a device for preselection, that is to say a filter (F1), which only permits that frequency band to pass which is to be analyzed. On the other hand, should the incoming current only comprise such frequencies that are to be analyzed, F1 may be omitted. The wave analyzer may preferably be constructed so that the oscillator frequency, for instance 45,000 cycles plus the measuring frequency (E), for instance 5000 cycles behind a mixing stage, passes through a band filter F2, whereafter an indicating instrument, such as a relay or rotary-coil instrument, can be actuated.

For accurate measuring of distances, it is necessary not only to be able to measure the beat frequency obtained, but also, and to the same extent, to be able to control the frequency modulation of the transmitter. Here, the average frequency of the transmitter may be controlled and the frequency modulation controlled separately by a control of the voltage for the frequency modulation. In velocity modulated electron tubes and magnetrons, for example, a sufficiently powerful frequency modulation may be obtained by an alteration of the anode voltage.

In velocity modulated electron tubes a certain change of the frequency may also be obtained, if the velocity of the electron ray is altered. This may take place by varying the voltage on one or more electrodes arranged in the way of the electron ray, or by changing the volume of cavity resonators of a velocity modulated electron tube.

If in addition to the basic frequency of the transmitter, the above mentioned voltage for the frequency modulation be also controlled automatically or manually by instruments sensitive to voltage, a full control of the transmitter will be obtained.

The most effective control of the transmitter is believed to be obtained if in accordance with the present invention waves are always or at any rate rather frequently passed over two known fixed distances, and the control beat frequency then obtained is measured at the remote end of said two fixed known distances. This measurement may be effected either manually or automatically.

Particularly in manual control of the beat frequency obtained from the two fixed known distances, a wave analyzer may be made use of, which can be switched in by means of a switch, and is thus caused to measure the frequency.

In automatic control of the beat frequency and thus of the basic frequency and modulation of the transmitter, correction of the transmitter frequency should be effected, if the control beat frequency obtained from the two fixed known distances is not correct. For this reason, the separate frequency measuring device then used should be "double-peaked."

The control voltage $E_k$ may of course actuate any regulating device, such as relays, amplifiers, motors, and so forth, to regulate the transmitter so as to make it operate correctly.

When control is effected by means of two known fixed distances, as is the case here, it is understood that the frequency of the transmitter need not have a definite value, it being only necessary that the frequency modulation is such that a correct beat frequency is obtained from the two known fixed distances.

In Fig. 1, the transmitter 101 is an ultra-short wave transmitter provided with the reflector 102 secured to the horizontal shaft 110. Secured to the same shaft is the ultra-short wave receiver 103 with the reflector 104. Placed in front of the reflector 104 is a diaphragm device consisting of a rotating metal disk 105 provided with an eccentric aperture 106 for the purpose of alternately admitting the passage of energy of radiation to the receiver 103 from opposite equally large portions of the total searching field. The rotating disk, which is connected to the shaft 108 by means of a toothed gearing 107, is driven by the motor 18, which is provided with a field winding 19 and a source of current 20.

The transmitter and the receiver with the motor 18 are rigidly mounted about the shaft 110 which is journalled in the fork 109. The horizontal shaft 110 is driven through a worm gearing 16, 17 by the motor 15, so that the transmitter and the receiver may at a turning movement of 180° be directed in a certain vertical plane at a certain angle to the sky. The fork 109 is provided with a vertical post 111 and with bearing means, whereby the fork may also be turned with the transmitter and the receiver into any desired position in the horizontal plane by means of the worm gearing 13, 14 and the motor 112.

The motor 112 is provided with two field windings 27 and 28 to drive the motor in the one or the other direction, and 29 is a "Thyratron" relay and energy storage device of the same construction and coupling which is shown at the top of the drawings (30 and 46) for the motor 15, which takes care of the turning of the transmitter and the receiver about the shaft 110. The motor 15 is provided with two field windings 31 and 32 in combination with the "Thyratron" relay device 30 for turning in the one or the other direction. The "Thyratron" relay device is of known type and comprises two gas-filled "Thyratron" tubes with a grid 44 and an anode 33 and a grid 45 and an anode 34 respectively. Each "Thyratron" tube is supplied with bias voltage by means of a coil 36 and 37 respectively constituting the secondary windings of a transformer having the primary winding 35. Connected in series with the secondary winding 36 are a variable resistance 38 and a condenser 39. The secondary winding 37 is connected in series with a variable resistance 41 and a condenser 40. Furthermore, the one pole of each secondary winding is connected over a grid leak to the respective "Thyratron" grid. Furthermore, the left "Thyratron" is provided with a resistance 42 connected between the cathode in series with the variable resistance 38 and the grid leak to the grid 44. The cathode and the grid of the "Thyratron" on the right hand side are connected in a similar manner over resistance 43 and variable resistance 41.

The receiver or detector 103 is provided with an amplifier 49 with automatic volume control and with a rising amplifying degree for high frequencies. One side of the rectifier bridge 50 is connected to the amplifier 49, while the other side thereof is connected to the relay R1 and to the contact roller 25 on the shaft 108 and to the middle point of an energy storage device 46 comprising condensers 47 and 48 for wave energy received. The outer sides of said storage device 46 are connected with the contact rollers 23 and 24 to direct received wave energy from opposite directions of "the search field" in a vertical direction to the "Thyratron" relay device 30 for the purpose of operating the motor 15 in one or the other direction.

For the guidance of the movement in a horizontal direction there are provided contact rollers 21 and 22 which are connected to the corresponding "Thyratron" relay and storage device 29 for wave energy received from opposite sides of the search field in a horizontal direction to steer the motor 112 in the one or the other direction.

51 is a frequency meter on which the beat frequency between a transmitted wave and a reflected wave may be read off directly. 52, 53 is a Thompson-bridge device in the form of a potentiometer 52 rotating on the shaft 61. 53 is a source of potential. The bridge device is connected between the frequency meter 51 and the amplifier 54 and in series with the polarized relay R9 and the relay R10.

59 is a motor adapted to drive the shaft 61 through the gear 60, said shaft 61 having mounted thereon the said potentiometer as well as a variable condenser 62 of the wave analyzer 63. 64 and 65 are field windings serving to operate the motor 59 in the one or the other direction. 66 is a tachometer indicating the number of revolutions or velocity or change of velocity per time unit in the one or the other direction from the initial position of the motor 59. Said number of revolutions or velocity or change of velocity per time unit is proportional to the beat frequency or its variation measured in the wave analyzer 63, and is thus proportional to the distance the velocity or change of velocity per time unit respectively of an object.

Mounted on the vertical shaft 111 is a cam disk 71, about which the contacts 72, 73, 74 and 75—78 are rotatably displaceable relatively to the cam disk. Said springs and the cam disk have for their object to define the searching movement in a horizontal direction. When the cam of the cam disk 71 actuates the spring contact 72 and the spring contact 76 respectively in the one or the other extreme position, the relay R3 will be actuated, the direction of the current being then changed in the field windings of the motor 112, as will be described hereinafter.

R4 and R5 have for their object at each oscillation in a horizontal direction in the extreme positions by means of the motor 15 to turn the searching device in the vertical direction by a few degrees. The relay R4 is provided with an armature 87 and a notch wheel 86, which drives a cam disk 83. The cam disk 83 determines whether the relay R6 shall be energized or deenergized. The step relay R4 is so constructed as to cause advancement by a certain number of steps corresponding to the angular magnitude of the vertical sector, whereupon it closes its contact 84, 85 so as to cause the relay R6 to be energized.

At the energization of the relay R6, the direction of the current in the motor 15 is changed over corresponding "Thyratron" relays. The only function of the cam disk 79 is at the searching for a target to limit the movement downwardly in a vertical direction, so that the transmitter and the receiver do not search too far down toward the surface of the ground.

The relay R2 is intended to switch the transmitter and the receiver from searching to following. The relay R7 is adapted to be attracted for a short moment at the dropping of the switch 89 in the one or the other position, until the desired searching position has been reached in the vertical plane. This will result in that the maneuvering current to the motor 15, which is normally steered by the relays R5 and R4, is switched off over the contacts 1—2R7 and 4—5R7, and in that the motor 15 is steered by means of the switch 89 over the Thyratron relay device 30 in the one or the other direction, as long as the switch is held in the one or the other position.

The transmitter 101 is provided with a means for distance control. As stated before, an accurate measurement of the distance is dependent either on the frequency of the transmitter or on the degree of modulation thereof, or on both. A variation of the basic frequency of the transmitter need not necessarily cause any error in the measuring of distances, provided the degree of frequency modulation of the basic frequency be corrected in a corresponding degree. In the form of embodiment according to Fig. 1, this method is made use of, in that the degree of modulation is automatically caused to maintain such values that an exact beat frequency is obtained with the aid of two known paths of fixed lengths, for example two concentric or tubular conductors the difference of length of which may be 50 to 100 meters, for example, through which waves from the transmitter are permitted to pass.

Extending from the transmitter is a tubular conductor 92, which is movably connected from the center of the horizontal shaft 110 with a tubular conductor 93 which, in turn, is movably connected with the conductor 94 through the center of the vertical shaft 111. The conductor 94 is branched, partly over the known distance 96, and partly directly to a resonator 97, where the direct wave through the conductor 95 and the wave through the said known distance 96 are caused to mix. Hereby a beat tone is obtained, which can be measured or controlled, and which may be caused by means of the device to maintain a certain constant value. When the frequency deviates from the established value corresponding to the said known distance, the frequency of the transmitter can be corrected automatically. This frequency correction comprises the detector 98, which may be a diode, a bolometer or the like, the amplifier 99, the filtering and rectifier device 100, a grid leak 115, an electron tube 116.

Provided for the frequency modulation is a relaxation oscillation generator 127 with an anode battery 117 and a high voltage rectifier 26 for the anode voltage of the transmitter.

Here, the frequency modulation is effected by an alteration of the anode voltage of the transmitter by means of the relaxation oscillation generator 127. The amplitude of the relaxation oscillator may be changed with the aid of the electron tube 116. By changing its normal grid bias, an anode voltage of higher or lower value may be supplied to the relaxation oscillator 27.

The filtering and rectifier device 100 comprises two filter circuits tuned for something above and below the beat frequency corresponding to the difference of lengths of the two known distances. For example, if the said difference is 75 meters and the average beat frequency corresponding thereto is taken to be 75 cycles per second, the one filter circuit is tuned, for instance, for 70 cycles and the other for 80 cycles. As will appear from the diagram, the current from each filter circuit is rectified. The two currents thus obtained are rectified in opposite directions to each other, and the difference is supplied to the grid circuit of the electron tube 116.

At a normal beat frequency, such as 75 cycles, the same voltage is obtained over the two filter circuits, so that the difference in voltage to the grid circuit will be practically naught. On the other hand if the modulation or the basic frequency of the transmitter is changed, so that a beat tone of 70 cycles is obtained in place of the correct tone of 75 cycles, a higher voltage is understood to be obtained over the one filter circuit than over the other, there being thus also obtained a disparity voltage of the common rectified voltage taken off the circuits.

This disparity voltage, which is supplied to the grid circuit of the electron tube 116, will thus bring about a correction of the degree of modulation of the transmitter, until the beat frequency reassumes its correct value for 75 cycles.

In place of the automatic adjustment, the adjustment may be effected manually by the insertion of a measuring instrument for reading in place of the grid resistance 115. A variation of the voltage of the relaxation oscillation generator may then take place by means of a manually operable rheostat in place of the tube 115.

In modulating the frequency by an alteration of the anode voltage of the transmitter, various methods may be resorted to. In Fig. 1, a voltage is supplied from the relaxation oscillation generator 127, which is added and subtracted in combination with the voltage from the rectifier 26, so that a substantially linear voltage variation is obtained with respect to the anode voltage. Such voltage variation may of course be obtained if a modulation voltage is applied in parallel over the rectifier 26, or, the load on the rectifier may be varied. This may be effected, for example, by varying a resistance in any known manner. Alternatively, said resistance may be connected in series with the rectifier, in as much as a variation of the voltage is obtained in the desired manner as well.

From the transmitter an overtone may be taken out with advantage, such as the third overtone, which is supplied to the tube loop for the known fixed distances. Hereby smaller dimensions are obtained for the said tube loop and, in addition a higher beat frequency is obtained, whereby smaller dimensions will be obtained for the filter elements.

The device according to Fig. 1 operates in the following manner. The device is preferably started by being connected to the respective sources of current 118 and 119. The rectifier "Thyratron" relay and energy storage devices 29 and 30—46 with the motors 112 and 15 respectively pertaining thereto are thus rendered ready to be started for rotation in the one or the other direction. The "Thyratron" relay and energy storage device 29 receives grid bias from battery 88 and ground over the contacts 1—2R3 and 4—5R3 and over the contacts 8—9R3 and 12R2. One "Thyratron" tube is thus caused to light, and the motor 112 receives current and commences to rotate in the one direction. When the cam disk 71 brings about contact between the contact springs 72, 73 and 74, the relay R3 is attracted in the manner previously described. The current then changes its direction to the grid circuit of the "Thyratron" tube, so that the second "Thyratron" tube of the same relay device is caused to light and the motor 112 is brought to a standstill and then rotates in the other direction. When the cam disk 71 then actuates the contacts 75—78, the relay R3 drops in the manner previously described, so that the motor 112 is again caused to alter its direction of rotation, and so forth.

In the extreme positions of the cam disk 71, the relays R4 and R5 are attracted for a short moment in the manner above described. The contacts 1, 2 and 3, 4 of the relay R5 are then closed, current from the battery 88 being thus caused to light one of the tubes of the "Thyratron" relay device 30, whereby the motor 15 will receive current. The motor 15 thus receives a current impulse and is caused to turn by a certain angle each time the relays R4 and R5 are attracted, that is to say, each time the cam disk 71 reaches its extreme position.

Consequently, a rotary reciprocating turning movement of the transmitter and the receiver in a horizontal direction will be obtained in the manner described, in addition to which a successive raising or lowering movement of the transmitter and the receiver will be attained in a vertical direction, depending on the sectors in the horizontal and the vertical direction, for which the cam disks 71 and 79 are adjusted.

During the searching movements described, directed ultra-short waves are transmitted through the transmitter, said ultra-short waves being subjected to frequency modulation by means of the relaxation oscillation generator 127 wtih the anode battery 117, in the manner hereinbefore described. A small portion of these waves is supplied to the receiver 103 either directly or by means of a reflecting small metal mirror device, the mirrors being arranged in front of the reflectors in known manner.

If during the movements the transmitted directed bundle of ultra-short waves hits an object, a portion of the waves will be reflected and received by the receiver. A beat frequency will then be produced between the directly received wave and the wave received upon reflection from the object, said beat frequency on having been amplified in the amplifier with automatic volume control (49) and on having been rectified in the bridge 50 being caused to actuate the relay R1, which is attracted so as to close its contacts 1, 2. Then the relay R2 will be attracted so as to switch from searching the object to following the same.

The following of the target takes place in the following manner: Radiating energy from opposite, equally large parts of the total searching field is admitted through the previously described diaphragm device consisting of the rotating disk 105 provided with an eccentric aperture 106. The beat frequencies thus generated with the directly received wave are conducted, on having passed through the bridge rectifier 50, over the contact roller 21—25 to the energy storage device in the form of the condensers 47 and 48. Said condensers store the beat energy received, for instance, from the upper and lower parts respectively of the searching field, the cam disks 23 and 24 being adjusted in a corresponding relationship to the diaphragm device 105.

If the wave energy received from said opposed upper and lower parts of the searching field is of the same magnitude the condensers will be charged by the same amount, and there will be no effect. On the other hand, should the charges be of a different magnitude, because the receiver is not directed exactly to the target, one of the condensers will be charged more than the other. The voltages thus produced actuate the grid voltages on the respective "Thyraton" relay devices 30 over the contacts 1, 2 and 4—5 of the relay R2 which is now operative. Hereby more or less current will be admitted through the one or the other tube, more or less current being thus caused to pass through the one or the other field winding 31 or 32 of the motor 15, so that the latter rotates in the one or the other direction.

In the same manner, a control of the motor 112 will be obtained for the movement in a horizontal direction through the contact rollers 21 and 22, the "Thyraton" relay and energy storage device 29 and the field winding 27 and 28.

In the same manner, the device may be caused accurately to follow an object on its having once been localized by the searching operations as hereinbefore described.

The device having now been caused constantly to follow the object, a preliminary and then an accurate continuous and automatic measurement of the distance to the said object can be effected in the following manner.

From the beat frequency hereinbefore described and generated at the reception of reflected wave energy a current will be obtained, which is branched partly to a directly readable frequency meter 51 and partly to a wave analyzer 62—63. At the exit from the directly readable frequency meter 51 a voltage will be obtained, which, on having passed through a potentiometer 52, 53 and, if desired, through an amplifier 54, may actuate the polarized relay R8 as well as the relay R10.

If the fall in voltage in the potentiometer V2 is equal and oppositely directed to the voltage V1, no current will pass through the relays R8 or R10. Again, if V2 differs from V1, there will be a current passing to R8 and R10. The armature 56 of R8 will then make contact with the contact 55 or 57, depending on which potential is the greatest. As long as R10 is energized, the motor 59 with the field windings 64 and 65 rotates in the one or the other direction and through the worm gearing 60 causes the potentiometer to rotate on the shaft 61, until the voltage V1 is equal to V2, it being then possible approximately to read off the distance to the object on the frequency meter.

Upon this preliminary coarse adjustment, and V1 being equal to V2, the relay R10 releases its armature, the control being then assumed by the wave analyzer 62—63 and by the polarized relay R9 connected thereto, fine adjustment being then effected by the motor 59 rotating in the one or the other direction, until the variable condenser 62 arranged on the shaft 61 has been adjusted for a wave length corresponding exactly to the beat frequency and thus to the distance to the object. Reading off of the distance may take place on a tachometer 66, which according to the number of revolutions made by the motor from the initial position may be graduated in such manner that the distance to the object is given exactly in meters, or the velocity or changes of velocity per time unit can be read on a similarly connected tachometer graduated accordingly.

Figure 2:
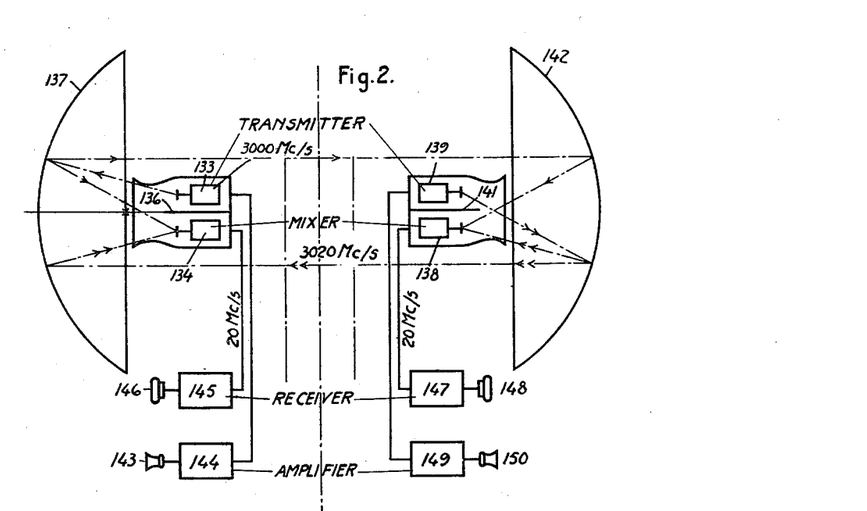
Fig. 2 is a diagrammatic representation of an ultra-short wave communication connection with simultaneous transmission and reception in both directions between two stations.

In Fig. 2, which shows a directed ultra-short wave telephone connection between two stations, the ultra-short wave transmitter with the frequency stabilizer 133 and the mixer 134 are enclosed in a metal vessel and separated by a partition 136; the vessel being provided with an opening pointing toward the focus of a parabolic or other reflector 137. The microphone 143 is connected to a modulator and amplifier 144 for the transmitter. The mixer 134 is connected to a short wave receiver 145 with a head-phone 146.

At the other station, the corresponding parts are designated as follows: the transmitter with the frequency stabilizer by 139, the mixer by 138, the partition by 141, the reflector by 142, the modulator and amplifier by 149, the microphone by 150, the short wave receiver by 147 and the head-phone by 148.

The arrangement according to Fig. 2 is intended for simultaneous directed transmission and reception for communicating purposes.

Frequency transformation, so that reception may be had with a standard short wave receiver for 20 mc./s., for example, is obtained by making the transmitters 133 and 139 operate with 3000 mc./s. and 3020 mc./s. respectively, for example, a difference in frequency of 20 mc./s. being then obtained in the mixer stages 134 and 138, which disparity frequency may be received by said receivers 145 and 147 respectively.

The arrangement according to Fig. 2 operates in principle in such manner that a transmitted wave, for instance from the transmitter 139, is reflected at the transmitting station by the reflector 142 and at the receiving station by the reflector 137. At the same time wave energy is also transmitted from the transmitter 133, which energy is reflected from the reflector 137 and actuates the mixer 134, a mixture of the wave energy transmitted from the one station and of the wave energy received from the other station being thus obtained.

According to the present invention, the frequency stabilization is effected by means of oscillators with the aid of closed metal cavity resonators, as will be described hereinafter.

Figure 3:
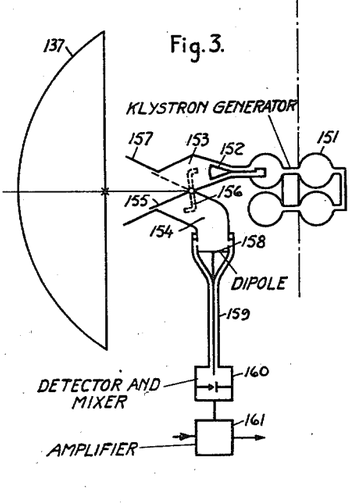
Fig. 3 is a diagrammatic representation of the one station of an ultra-short wave communication connection with a switching means between the transmitter and the receiver, in which the same reflector is used to direct ultra-short waves as transmitted and received.

Fig. 3 shows another form of embodiment for directed transmission and reception, according to which embodiment all stations are fitted in the same manner both for transmission and for reception, the same wave length being used for the transmitted wave, such as 3000 mc./s., while a local oscillator with a small output for 3020 mc./s., for example, is being employed for the generation of a beat frequency of 20 mc./s.

Automatic frequency control may be provided at the transmitter as well as at the local oscillator.

In Fig. 3, a velocity modulated generator 151 is provided with a concentric radiating element 152 for the transmission of ultra-short waves through the closed metal vessel 153, said waves being conveyed further through the conical nozzle 157 directed toward the focus of the parabolic mirror 137. The wing-shaped valve device 156 in Fig. 4 with the flap 155 is rotatable about its axis 157 to permit alternate transmission and reception over the same reflector 137. At reception, the flap 155 is raised in the drawing, and the wave energy received passes through the closed metal vessel 154 to the dipole or receiver element 158, and is then conveyed through a concentric conductor 159 to a detector-mixer 160, to which is connected a local oscillator (not shown in the drawing), a beat frequency of for instance 20 mc./s. being then obtained, from which speech or signals are demodulated in known manner. Connected to the mixer 160 is an amplifier 161 in the form of a short wave receiver for 20 mc./s.

Figure 4:
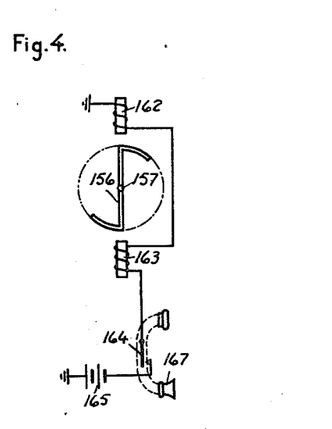
Fig. 4 shows a detail arrangement of a wing relay having for its object to connect the transmitter or receiver to the reflector as represented in Fig. 2.

In telephone communication, switching from transmission to reception may, for instance, take place according to Fig. 4, in that a telephone handle, for example, is depressed at transmission and released at reception, switching between the transmitter and the receiver being then effected to the reflector 137. If desired, switching may take place automatically, with arrangements for amplifying the microphone current in known manner. 162, 163 are electromagnets which may actuate the wings of the flap 155 at the closing of the contact 164, the battery 165 then sending a current through the electromagnets 162, 163 and shifting of the flap being effected.

In place of frequency control and stabilizing means as previously known, it is also possible to make use of resonator means both for frequency control and frequency stabilization and correction.

Ultra-short wave communication according to the present invention is important between places where wires or cables are too expensive or difficult to erect, for instance between fire-sentry towers in large forests or from these to places where firemen are quartered.

Figure 6:
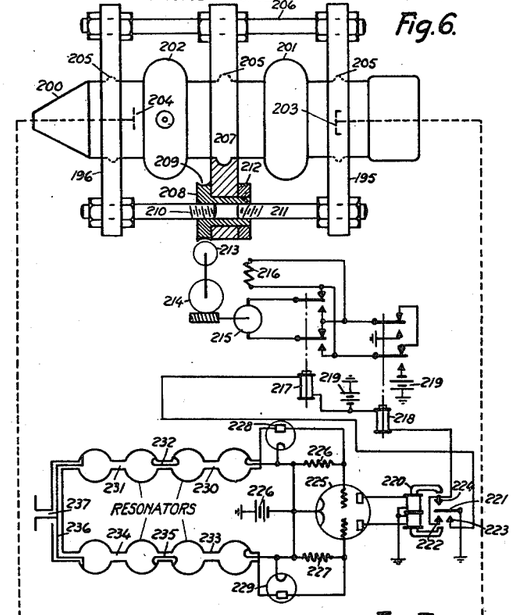
Fig. 6 is a diagrammatic representation of a velocity modulated electron tube provided with frequency stabilizing means and controlled by closed metal cavity resonators, and with means for mechanical adjustment of the oscillator.
Figure 7:
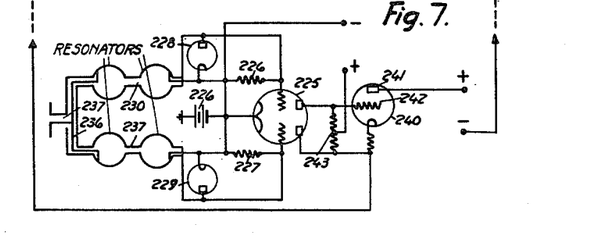
Fig. 7 shows the same oscillator and similar closed metal cavity resonators as in Fig. 3, wherein in place of the mechanical adjustment employed in Fig. 3 the adjustment of the oscillator takes place by controlling the anode voltage of the oscillator.

Figs. 6 and 7 are diagrammatic representations of frequency stabilizing means in an ultra-short wave transmitter provided with a velocity modulated electron tube. It is important in any ultra-short wave transmitter that its basic frequency is not altered to any appreciable extent, and this is particularly the case in applications for communicating purposes with superheterodyne reception.

In broadcasting, where, for instance, 500,000 cycles per second are used, a variation of the frequency of 0.1 per cent is of little account, since in that case the same only amounts to 500 cycles. With a superheterodyne receiver for a band width of 6000 cycles, for example, a variation as small as 0.1 per cent consequently is of no significance whatever.

With ultra-short waves, on the other hand, of a wave length of 10 centimeters or a frequency of $3 \cdot 10^9$ cycles per second, a variation of 0.1 per cent involves a variation of $3 \cdot 10^6$ per second. Consequently, it will not be possible to use ordinary superheterodyne reception from such a transmitter, inasmuch as an involuntary variation of this order reaches far beyond the band width of the superheterodyne receiver.

According to the present invention, a perfectly satisfactory stabilization of an ultra-short wave transmitter of velocity modulated electron tube type, for example, is obtainable with the aid of tuned cavity resonators of arbitrary type. An excellent result will be obtained with one or two cavity resonators connected in series and arranged in bridge-coupling between a dipole placed in the proximity of the transmitter to be controlled and a diode or bolometer-receiver intended to receive and control the basic frequency of the transmitter and, should the latter vary, immediately to cause adjustment or stabilization of the same.

These arrangements are shown in Figs. 6 and 7, wherein the transmitter 200 is provided with the cavity resonators 201 and 202 and with the cathode 203 and the anode 204. On both sides and between the cavity resonators, the transmitter casing is provided with flanges 205 for the purpose of securing the clamps 195, 196 and 207, which in known manner may increase or decrease the distance between the clamp 207 and the outer clamps 195 and 196 respectively by means of the screws 210, 211 and the nut device 208—212. Hereby the volume of the respective cavity resonators 201 and 202 will be decreased or increased, the basic frequency generated in the transmitter, which is dependent to a great extent on the volume of the respective rhumbatrons, being thus varied.

The nut device 208 is secured to the clamp 207 in the manner shown in the drawing, and is provided with a flange 209 on the one side thereof, said flange being threaded for a worm gearing 213. By means of a further series-coupled worm gearing 214, the nut device 208 may be driven by the motor 215 in the one or the other direction, when by means of the pole changing relays 217 and 218 the field winding 216 of the motor 215 receives current from the battery 219 in the one or the other direction.

The dipole 237 is connected by means of concentric conductors, partly to closed metal cavity resonators 231 and 230 connected in series, and partly to series-connected cavity resonators 234 and 233. The resonator 230 is connected to the diode 228, and the resonator 233 is connected to the diode 229. The diodes are, in turn, connected over the grid leaks 226 and 227 to the double amplifier 225, in which each anode is connected to a counteracting winding of the polarized relay 220 with the armature 221, the upper contact 224 and the lower contact 223.

Figure 5:
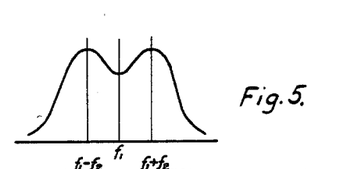
Fig. 5 shows a resonance curve of two circuits tuned to frequencies $f_1+f_2$ and $f_1-f_2$, above and below a certain mean frequency $f_1$.

The series-connected resonators 230 and 231 on the one side of the bridge-connection are tuned to frequency $(f_1-f_2)$, which deviates by the frequency $f_2$ from the desired basic frequency $f_1$, which the series-connected resonators 233—234 on the other side of the bridge-coupling are tuned to a frequency $f_1+f_2$ (see Fig. 5).

The device operates in the following manner. If the dipole 237 has been placed in the proximity of radiating energy from the transmitter 200 adapted to operate with a basic frequency $f_1$, wave energy of different magnitudes will pass through the parallel-connected resonators to the diodes 228 and 229 respectively, namely if the basic frequency differs from $f_1$. Consequently, if said frequency differs from $f_1$, more or less current will thus pass through the one or the other diode 228 or 229, and is then amplified in the tube 225, the armature of the polarized relay 220 being then actuated in the one or the other direction so as to close controlling circuit to the pole changing relays 217 and 218. The motor 215 is then driven in the one or the other direction, and the motor 208 rotates slowly in the one or the other direction.

The screws 210 and 211 will now be pressed from or toward one another, the volumes of the resonators 202 and 201 being increased or decreased, which is also the case with the basic frequency of the transmitter 200, namely if the latter differs from the established frequency $f_1$. At a variation of the temperature during different seasons of the year, for example, the transmitter may be subjected to casual as well as to periodic variations.

The stabilizing resonators 230, 231 and 233, 234 should be placed in a thermostat to ensure an exact basic frequency in all instances, that is to say, if it important that the frequency of the transmitter be kept constant.

Fig. 7 illustrates an example, which shows how the basic frequency of the transmitter may be kept constant by electrical means instead of by mechanical means such as shown in Fig. 6. Thus Fig. 7 shows that the basic frequency of the transmitter 200 may be stabilized by an alteration of its anode voltage by means of bridge-connected resonators, diodes and double amplifiers in a similar manner as shown in Fig. 6. Here, however, an amplifier tube 240 with a potentiometer grid leak 243 is being used in place of the polarized relay 220 in Fig. 6, the middle point of which grid leak is connected to a fixed grid potential.

When more or less current is admitted through the one or the other of the anodes of the double amplifier tube 225, the voltage on the grid 242 of the amplifier tube 240 will be increased or decreased. Hereby, the degree of amplification of the anode voltage admitted over the tube 240 to the anode of the klystron is increased or decreased.

Figure 8:
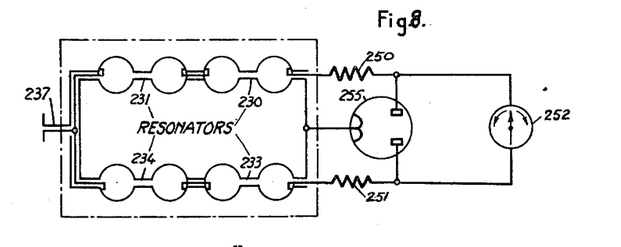
Fig. 8 is a diagrammatic representation of a frequency measuring device to measure the frequency of ultra-short wave transmitters for manual adjustment of the frequency.

Fig. 8 shows a frequency measuring device for the control of ultra-short wave frequencies, it being possible here to effect the adjustment of a transmitter manually in place of using automatic mechanical adjustment or anode voltage adjustments.

Parallel-connected and series-connected cavity resonators are here bridge-connected to a double diode 255 in the manner shown in Figs. 6 and 7, equally great resistances 250 and 251 being series connected between the anodes of said double diode and the respective cavity resonators. Connected between the anodes there is a galvanometer with zero adjustment, on which any difference of the basic frequency from the prescribed frequency may be read off.

Figures 9, 10, 11, 12, 13:
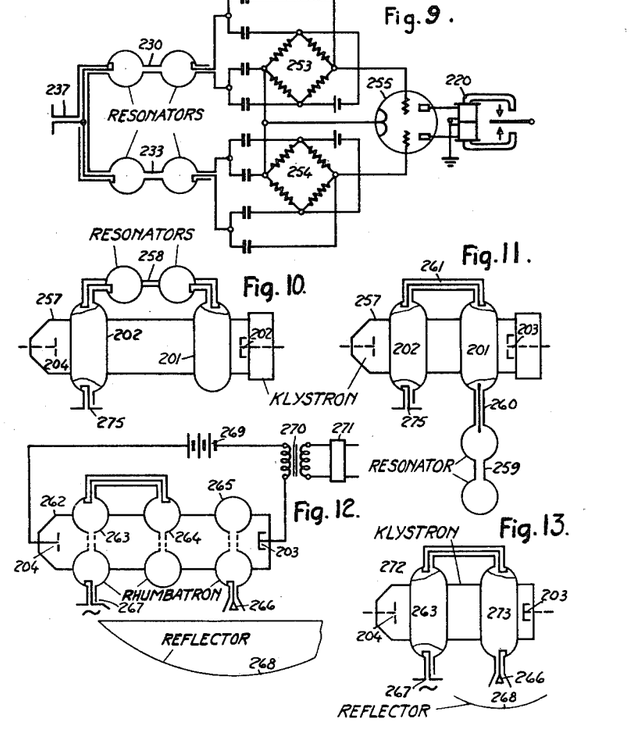
Fig. 9 is a diagrammatic representation of a detail of a frequency stabilizing device similar to that shown in Fig. 6, but having a bolometer device in place of the rectifier diodes shown in Fig. 6 or in Fig. 7.
Fig. 10 is a diagrammatic representation of a stabilizer device to stabilize the frequency of a velocity modulated oscillator, which may be used either as a transmitter or as a local oscillator in superheterodyne reception.
Fig. 11 is a diagrammatic representation of a further alternative for the stabilization of the frequency of an oscillator.
Fig. 12 is a diagrammatic representation of an ultra-short wave receiver with three cavity resonators and provided with a mixer device for energy taken from a local oscillator.
Fig. 13 is a diagrammatic representation of a still further alternative of an ultra-short wave receiver provided with a mixer device to receive energy from a local oscillator for superheterodyne reception.

Fig. 9 shows a frequency stabilizing means similar to that shown in Fig. 6, but here bolometer arrangements 253 and 254 are being used in place of the diodes 228 and 229, condensers having been connected between the respective cavity resonators and arms of the bolometers. A bolometer device, shown as a rectifier in Fig. 9, is superior both to diode and crystal rectifier devices, inasmuch as such a bolometer device will keep constant, which is not the case either with a diode or with crystals.

An arrangement similar to that shown in Figs. 6, 7 or 9 can be brought into use to keep the frequency of such a transmitter constant, as shown in Fig. 1.

In Fig. 10, the velocity modulated oscillator 257 is provided with cavity resonators 258 between the two cavity resonators 201 and 202 thereof. By connecting such cavity resonators between the two cavity resonators of the oscillator, the output of the oscillator taken off the terminals 275 thereof will be stabilized.

In Fig. 11, which shows a variation of the oscillator shown in Fig. 10, the cavity resonators 201 and 202 are connected with each other in the ordinary manner over concentric conductors 261. The cavity resonator 201 adjacent to the cathode 203 is connected over concentric conductors 260 with an additional cavity resonator 259, as shown in the drawing, for the purpose of obtaining a stabilized output.

In Fig. 12, which is a diagrammatic representation of a superheterodyne receiver for ultra-short waves provided with a mixer device for ultra-short waves received and for energy from a local oscillator, the receiver is combined with the mixer.

Here, the oscillator device 262 is provided with three cavity resonators. The cavity resonator 265 with the dipole 266 is intended for the reception of ultra-short wave energy over the reflector 268.

The cavity resonators 263 and 264 are intended to mix the output from a local oscillator, the energy of which is received over the dipole 267, with the ultra-short wave energy received from the space. By connecting a transformer 270 with a battery 269 in series with anode 204 and cathode 203, it will be possible from the secondary winding of the transformer to receive intermediate frequency as a difference between the wave energy amplified in the first cavity resonator 265 and the local oscillator frequency, whereupon the intermediate frequency is amplified in the ordinary manner in the amplifier 271, after which reception may take place by means of an ordinary short wave set.

Fig. 13 shows a variation of the arrangement according to Fig. 12, a velocity modulated device 272 with two cavity resonators being used. Here, ultra-short wave energy is received in the first cavity resonator 273 over the reflector 268 and the dipole 266. The local wave energy is fed into the second cavity resonator 263 over the dipole 267. The two cavity resonators are connected with each other in the ordinary manner. Here, a mixture of the respective frequencies is obtained, and intermediate frequency may be taken off in the manner described with reference to Fig. 12.

Having now particularly described and ascertained the nature of our said invention and in what manner the same is to be performed, we declare that what we claim is:

1. Frequency stabilizing means for a frequency modulated ultra-short wave generator, comprising means for passing waves from said generator over two paths of different known fixed lengths, means for receiving and mixing said waves, after having passed over said two paths, in order to produce a control beat frequency, and regulating means responsive to the produced control beat frequency, said regulating means being interconnected between the said receiving and mixing means and said generator, whereby the said regulating means serves to regulate the transmitted frequency and its modulation upon variation of said control beat frequency from its normal value, which corresponds to the difference between the said fixed known lengths.

2. The frequency stabilizing system claimed in claim 1, in which two counter-connected circuits are interconnected between the said receiving and mixing means and said regulating means, said circuits being tuned to frequencies above and below said produced control beat frequency, whereby said regulating means is automatically operated according to the nature of the potential delivered by said tuned circuits to said regulating means.

3. The frequency stabilizing system claimed in claim 1, in which the said two paths provided by said control means are dimensioned to conduct a harmonic of the transmitted basic frequency to said mixing means, and in which two counter-connected tuned circuits are interconnected between said mixing means and said regulating means, said circuits being tuned to frequencies above and below said beat frequency produced in said mixing means by said harmonic arrived over said two paths.

4. The frequency stabilizing system claimed in claim 1, in which the mixing means comprises a resonator tuned to the mean value of the basic frequency transmitted by said transmitting means.

5. The frequency stabilizing system claimed in claim 1, in which the mixing means comprises a resonator tuned to the mean value of a harmonic of the basic frequency of said transmitting means.

6. In a device adapted for distance measurement by means of frequency modulated ultra-short waves, the combination of a frequency modulated ultra-short wave transmitter with a frequency stabilizing system comprising control means for passing transmitted waves over two paths of different known fixed lengths, mixing means constructed and disposed to mix the transmitted waves, after having passed over said two paths of different known fixed lengths, in order to produce a control beat frequency, and regulating means responsive to the produced control beat frequency, said regulating means interconnecting the transmitting means and said mixing means, whereby the said regulating means serves to control the transmitted frequency and its modulation in dependence upon said beat frequency in which two counterbalanced tuned circuits are interconnected between said mixing means and said regulating means, said circuits having a common output, one of said tuned circuits being tuned to a frequency being somewhat higher and the other tuned circuit being tuned to a frequency being somewhat lower than the said produced beat frequency; said regulating means comprising a relaxation oscillation generator coupled to said transmitting means and a triode comprising an anode and a grid, said grid being coupled to the common output of the said two tuned circuits and said anode being so coupled to the said relaxation oscillation generator that, upon a variation of the control beat frequency, the basic frequency and its modulation of the said wave transmitter are correspondingly varied.

7. In a system for measuring distances to an object by the use of a transmitter for transmitting frequency modulated radio waves to be reflected by said object and of a receiver to receive said transmitted and reflected waves to form a beat frequency corresponding to the distance to said object, control means for controlling the frequency of said transmitted frequency modulated waves, comprising means for passing transmitted waves from said transmitter over two paths of different fixed known lengths, receiving and mixing means constructed and disposed to receive and mix the said transmitted waves, after having passed over the said two paths of different fixed known lengths, in order to produce a control beat frequency, and measuring means responsive to the produced control beat frequency and coupled to the said receiving and mixing means for measuring the said control beat frequency, to be used for correcting the measured distance to said object, when the said control beat frequency differs from the normal value which corresponds to the difference between the said fixed known lengths.

8. In a system for measuring distances to an object by the use of a transmitter for transmitting frequency modulated radio waves to be reflected by said object and of a receiver to receive said transmitted and reflected waves to form a beat frequency corresponding to the distance to said object, control means for passing transmitted waves from said transmitter over two paths of different fixed known time delay characteristics, receiving and mixing means constructed and disposed to receive and mix the said transmitted waves, after having passed over the said two paths, for the generation of a control beat frequency, measuring means responsive to the generated control beat frequency and coupled to the said receiving and mixing means for measuring the said control beat frequency and frequency regulating means coupled to said transmitter for regulating the transmitted frequency and its modulation upon variation of said control beat frequency from its normal value corresponding to the difference of said two paths.

9. A frequency stabilizing system for frequency modulated wave transmitting means combined with receiving means and adapted for distance measurements to an object in order to form a beat frequency corresponding to the distance to said object, comprising control means for controlling the frequency of transmitted waves and including means for passing waves from said transmitting means over two paths of different fixed known lengths, receiving and mixing means constructed and disposed to receive and mix the said transmitted waves, after having passed over the said two paths of different fixed known lengths, in order to produce a control beat frequency, and regulating means responsive to the thus produced control beat frequency, said regulating means interconnecting the transmitting means and said mixing means, whereby the said regulating means serves to regulate the transmitted frequency and its modulation, when the said control beat frequency differs from the normal value which corresponds to the said fixed known lengths.

10. A frequency stabilizing system for frequency modulated ultra-short wave transmitting means combined with receiving means and adapted for distance measurement to an object in order to form a beat frequency corresponding to the distance to the said object, comprising means for passing transmitted waves over two tubular conductors of different fixed known lengths, receiving and mixing means constructed and disposed to receive and mix the said transmitted waves after having passed over the said two tubular conductors, in order to produce a control beat frequency, and regulating means responsive to the thus produced control beat frequency, said regulating means interconnecting the transmitting means and said mixing means, whereby the said regulating means serve to regulate the transmitted frequency and its modulation, when the said control beat frequency differs from the normal value corresponding to the said fixed known lengths.

11. A frequency stabilizing system for frequency modulated ultrashort wave transmitting means combined with receiving means and adapted for distance measurement to an object in order to form a beat frequency corresponding to the distance to the said object, comprising means for passing waves from said transmitting means over two concentric conductors of different fixed known lengths, receiving and mixing means constructed and disposed to receive and mix the said transmitted waves after having passed over the said two concentric conductors, in order to produce a control beat frequency, and regulating means responsive to the thus produced control beat frequency, said regulating means interconnecting the transmitting means and said mixing means, whereby the said regulating means serve to regulate the transmitted frequency and its modulation, when the said control beat frequency differs from the normal value corresponding to the said fixed known lengths.

12. A frequency stabilizing system for frequency modulated ultrashort wave transmitting means, comprising a frequency stabilizing means for passing the transmitted waves over two paths of different fixed known lengths, mixing means comprising a resonator tuned to an average value of the transmitted frequency, said mixing means constructed and disposed to mix the transmitted waves, after having passed over said two different known fixed lengths in order to produce a control beat frequency, and regulating means responsive to the produced control beat frequency, said regulating means interconnecting the transmitting means and said mixing means, whereby the said regulating means serves to control the transmitted frequency and its modulation, when the said control beat frequency differs from the normal value corresponding to the said fixed known lengths.

13. A frequency stabilizing system for frequency modulated ultrashort wave transmitting means, comprising a frequency stabilizing means including control means for passing transmitted waves over two paths of different known lengths, a cavity resonator tuned to the average value of the transmitted frequency, a diode coupled to said cavity resonator to mix the transmitted waves, after having passed over said two paths, in order to produce a control beat frequency, and regulating means responsive to the produced control beat frequency, said regulating means interconnecting the transmitting means and said diode, whereby the said regulating means serves to control the transmitted frequency and its modulation, when the said control beat frequency differs from the normal value corresponding to the said fixed known lengths.

14. Mixing means for mixing two ultrashort radio waves slightly differing in frequency from each other, consisting of a single cavity resonator tuned to an average value between the said two frequencies, means to admit the said two waves to the said cavity resonator, and a detector directly coupled to said cavity resonator for detecting and mixing the said two waves, in order to produce a beat frequency between the said admitted waves, and a measuring device coupled to said detector for measuring said beat frequency.

HELGE FABIAN ROST.
KARL HARRY THUNELL.
STEN DANIEL VIGREN.
PER HARRY ELIAS CLAESSON.

REFERENCES CITED

The following references are of record in the file of this patent:

UNITED STATES PATENTS

| Number | Name | Date |
|---|---|---|
| 1,626,724 | Demarest | May 3, 1929 |
| 2,243,202 | Fritz | May 27, 1941 |
| 2,294,942 | Varian | Sept. 8, 1942 |
| 2,236,893 | Chaffee | Apr. 1, 1941 |
| 1,924,174 | Wolf | Aug. 29, 1933 |
| 2,299,619 | Fritz | Oct. 20, 1942 |
| 2,242,249 | Varian | May 20, 1941 |